United States Patent Office.

ISRAEL G. HUSTED, OF BROOKLYN, NEW YORK.

Letters Patent No. 108,145, dated October 11, 1870.

IMPROVEMENT IN COMPOSITION FOR PRINTING-ROLLERS.

The Schedule referred to in these Letters Patent and making part of the same.

*To all whom it may concern:*

Be it known that I, ISRAEL G. HUSTED, have invented a new and useful Composition for Printing-Rollers; and I do hereby declare that the following is a full, clear, and exact description of the parts and proportions of the ingredients of my improved composition, and of the best method known to me of forming the mixture.

This compound, besides the ordinary ingredients, molasses and glue, used in forming printing-rollers, consists of shellac, blue vitriol, and prussiate of potash, in the proportions hereinafter stated.

One (1) gallon of molasses.
Five and one-half (5½) pounds glue.
One (1) gill shellac (dissolved.)
One (1) ounce blue vitriol.
One (1) ounce prussiate potash.

The molasses and glue I prepare in the usual way. After boiling about twenty minutes the dissolved shellac is added, and the mixture is permitted to boil fifteen minutes longer, and then the blue vitriol and the prussiate of potash are added, having been finely pulverized, and the whole then well cooked.

Rollers made of this material will wear longer, run smoother, and clean more easily, than any heretofore known to me; and, further, the same material can be taken from worn rollers and used again.

I do not claim the use of glue and molasses, though I do not confine myself to the precise proportions given, as they may be slightly varied without material change in result.

Having thus fully described my invention,

What I claim, by Letters Patent of the United States, is—

The described compound or mixture for printing-rollers, composed of the proportions substantially as specified.

ISRAEL G. HUSTED.

Witnesses:
SAMUEL WILDE, Jr.,
GEORGE E. ORTON.